(12) United States Patent
Fanfelle

(10) Patent No.: US 7,568,305 B2
(45) Date of Patent: Aug. 4, 2009

(54) FLOATING DECOY ADAPTER FOR LAND USE

(76) Inventor: Yves Fanfelle, W117 Hillendale Dr., Oconomowoc, WI (US) 53066

( * ) Notice: Subject to any disclaimer, the term of this patent is extended or adjusted under 35 U.S.C. 154(b) by 101 days.

(21) Appl. No.: 11/736,100

(22) Filed: Apr. 17, 2007

(65) Prior Publication Data

US 2008/0256838 A1 Oct. 23, 2008

(51) Int. Cl.
*A01M 31/06* (2006.01)
(52) U.S. Cl. .............. 43/3; 248/908; 248/156; 248/174; 248/300
(58) Field of Classification Search .......... 43/3, 43/2; 248/908, 156, 310, 688, 174, 300
See application file for complete search history.

(56) References Cited

U.S. PATENT DOCUMENTS

| | | | | |
|---|---|---|---|---|
| 364,573 A | * | 6/1887 | Brinkop | 43/3 |
| 554,368 A | * | 2/1896 | Kunselman | 43/3 |
| 694,732 A | * | 3/1902 | Coudon | 43/3 |
| 710,433 A | * | 10/1902 | Coudon | 43/3 |
| 843,588 A | * | 2/1907 | Ditto | 43/3 |
| 1,376,282 A | * | 4/1921 | Kauffman | 43/3 |
| 1,666,896 A | * | 4/1928 | Habenicht | 248/300 |
| 1,746,640 A | * | 2/1930 | Emoff | 43/3 |
| D87,702 S | * | 9/1932 | Aufiero | 248/300 |
| 2,189,478 A | * | 2/1940 | St George | 43/4 |
| 2,237,194 A | * | 4/1941 | Ohnmacht | 43/3 |
| 2,246,574 A | * | 6/1941 | Coe | 43/3 |
| 2,256,616 A | * | 9/1941 | Johnson et al. | 43/3 |
| 2,269,947 A | * | 1/1942 | Ludwig | 248/300 |
| 2,313,353 A | * | 3/1943 | Mills | 43/3 |
| 2,435,083 A | * | 1/1948 | Johnson | 43/3 |
| 2,437,604 A | * | 3/1948 | Hufford | 43/3 |
| 2,439,710 A | * | 4/1948 | Banigan | 43/3 |
| 2,450,572 A | * | 10/1948 | Ballard | 43/3 |
| 2,525,120 A | * | 10/1950 | Ernst | 43/3 |
| 2,536,736 A | * | 1/1951 | Gazalski | 43/3 |
| 2,547,286 A | * | 4/1951 | Sabin | 43/3 |
| 2,616,200 A | * | 11/1952 | Milam | 43/3 |
| 2,622,360 A | * | 12/1952 | Bertram | 43/3 |
| 2,624,144 A | * | 1/1953 | Beverman | 43/3 |
| 2,639,534 A | * | 5/1953 | Stossel | 43/3 |

(Continued)

FOREIGN PATENT DOCUMENTS

EP 71461 A1 * 2/1983

(Continued)

*Primary Examiner*—Darren W Ark
(74) *Attorney, Agent, or Firm*—Christopher L. Makay

(57) ABSTRACT

A floating decoy adapter for land use includes an attachment plate, a vertical support plate and a base section. The attachment plate extends substantially perpendicular from one end of the vertical support and the base section extends substantially perpendicular from the other end of the vertical support. The attachment plate includes a retention slot. The retention slot is sized to receive a projection extending along a length of a floating decoy. The base section preferably includes a portion having the substantial appearance of two webbed feet. At least one spike is inserted through the base section and into the ground to retain the floating decoy in an upright position. The floating decoy adapter is preferably fabricated of a flexible material, such that when the wind blows, the floating decoy will pivot relative to a support surface. However, the floating decoy adapter may also be fabricated from an inflexible material.

15 Claims, 4 Drawing Sheets

U.S. PATENT DOCUMENTS

| | | | | |
|---|---|---|---|---|
| 2,753,054 | A * | 7/1956 | Becher | 248/300 |
| 2,787,074 | A * | 4/1957 | Miller | 43/3 |
| 2,816,383 | A * | 12/1957 | Locher | 43/3 |
| 2,816,384 | A * | 12/1957 | Rexius | 43/3 |
| 2,952,090 | A * | 9/1960 | Pittenger | 43/3 |
| 3,470,645 | A * | 10/1969 | Mattson | 43/3 |
| 3,599,920 | A * | 8/1971 | Hoegerl | 248/300 |
| 3,768,192 | A * | 10/1973 | Caccamo | 43/3 |
| 4,120,110 | A * | 10/1978 | Aeschliman | 43/3 |
| 4,248,368 | A * | 2/1981 | Lindsay | 43/3 |
| D266,328 | S * | 9/1982 | Fleshman | 248/300 |
| D268,862 | S * | 5/1983 | Fulster | D22/125 |
| D268,863 | S * | 5/1983 | Fulster | D22/125 |
| D270,656 | S * | 9/1983 | Fulster | D22/125 |
| 4,435,913 | A * | 3/1984 | Messina | 43/3 |
| 4,471,991 | A * | 9/1984 | Matthias | 248/300 |
| 4,658,530 | A * | 4/1987 | Ladehoff | 43/3 |
| 4,691,463 | A * | 9/1987 | DeKezel et al. | 43/3 |
| 4,847,733 | A * | 7/1989 | Roy et al. | 248/300 |
| 4,885,861 | A * | 12/1989 | Gazalski | 43/3 |
| 4,893,773 | A * | 1/1990 | Fujimoto | 248/300 |
| 4,965,953 | A * | 10/1990 | McKinney | 43/2 |
| 5,098,050 | A * | 3/1992 | Bruns et al. | 43/3 |
| 5,168,649 | A * | 12/1992 | Wright | 43/3 |
| 5,189,823 | A * | 3/1993 | Lanius | 43/3 |
| 5,199,204 | A * | 4/1993 | Lowery | 43/3 |
| 5,205,060 | A * | 4/1993 | Franceschini | 43/3 |
| 5,231,780 | A * | 8/1993 | Gazalski | 43/3 |
| 5,274,942 | A * | 1/1994 | Lanius | 43/3 |
| 5,279,063 | A * | 1/1994 | Heiges | 43/3 |
| 5,375,363 | A * | 12/1994 | Higdon | 43/3 |
| 5,392,554 | A * | 2/1995 | Farstad et al. | 43/3 |
| 5,461,816 | A * | 10/1995 | Gazalski | 43/3 |
| D365,136 | S * | 12/1995 | Shaver et al. | D22/125 |
| 5,885,024 | A * | 3/1999 | Zupan et al. | 248/300 |
| 5,926,990 | A * | 7/1999 | Okimoto | 43/2 |
| 5,983,552 | A * | 11/1999 | Nelson | 43/2 |
| 6,131,361 | A * | 10/2000 | Murphy | 248/300 |
| 6,266,912 | B1 * | 7/2001 | Jirele | 43/3 |
| 6,336,286 | B1 * | 1/2002 | Liechty, II | 43/3 |
| 6,349,497 | B1 * | 2/2002 | Roddenbery | 43/3 |
| 6,374,530 | B1 * | 4/2002 | Mierau | 43/3 |
| 6,449,894 | B1 * | 9/2002 | Price et al. | 43/3 |
| 6,484,431 | B2 * | 11/2002 | Price et al. | 43/3 |
| 6,622,417 | B2 * | 9/2003 | Liechty, II | 43/3 |
| 6,625,919 | B1 * | 9/2003 | Davis et al. | 43/3 |
| D482,752 | S * | 11/2003 | Alexander et al. | D22/125 |
| 6,647,657 | B2 * | 11/2003 | Igo | 43/3 |
| 6,655,071 | B2 * | 12/2003 | Barnes et al. | 43/3 |
| 6,665,975 | B2 * | 12/2003 | Porter | 43/3 |
| 6,748,690 | B2 * | 6/2004 | Igo | 43/3 |
| 7,033,240 | B2 * | 4/2006 | Weiser | 43/3 |
| 7,076,909 | B2 * | 7/2006 | Heinn et al. | 43/3 |
| 7,082,710 | B1 * | 8/2006 | Jorgenson | 43/3 |
| 7,195,218 | B2 * | 3/2007 | James et al. | 248/300 |
| 7,337,575 | B2 * | 3/2008 | Hulley et al. | 43/3 |
| 7,409,793 | B1 * | 8/2008 | Schwarz | 43/3 |
| 7,421,819 | B2 * | 9/2008 | Zink, Jr. | 43/3 |
| 7,455,278 | B2 * | 11/2008 | Hsu | 248/300 |
| 2002/0145095 | A1 * | 10/2002 | Winkler | 248/300 |
| 2003/0192226 | A1 * | 10/2003 | Cain | 43/3 |
| 2003/0226307 | A1 * | 12/2003 | Hulley et al. | 43/3 |
| 2005/0108918 | A1 * | 5/2005 | Franceschini | 43/3 |
| 2005/0132632 | A1 * | 6/2005 | Fisher | 43/3 |
| 2005/0252067 | A1 * | 11/2005 | Wade | 43/3 |
| 2005/0268522 | A1 * | 12/2005 | Foster et al. | 43/3 |
| 2006/0283071 | A1 * | 12/2006 | Haley | 43/3 |
| 2007/0180753 | A1 * | 8/2007 | Zink et al. | 43/3 |
| 2007/0262222 | A1 * | 11/2007 | Steigert et al. | 248/300 |
| 2009/0126253 | A1 * | 5/2009 | Wood et al. | 43/3 |

FOREIGN PATENT DOCUMENTS

FR         2646588 A1 * 11/1990
GB        2295953 A * 6/1996

* cited by examiner

FLOATING DECOY ADAPTER FOR LAND USE

BACKGROUND OF THE INVENTION

1. Field of the Invention

The present invention relates generally to decoys and more specifically to a floating decoy adapter for land use, which enables a floating decoy to be used on land.

2. Discussion of the Prior Art

U.S. Pat. No. 6,374,530 to Mierau discloses a goose decoy. The Mierau patent includes a body frame having a neck frame selectively removably secured thereto. The body frame and the neck frame are comprised of flexible steel banding material so that the body frame and neck frame will move due to wind action thereagainst.

U.S. Pat. No. 7,033,240 to Weiser discloses a spring novelty with rotating appendage and removable securing portion. The Weiser patent includes a novelty with a head and appendages coupled to a body via coupling elements, and includes one or more rotating members so as to add dynamic and aesthetic beauty to any garden, kitchen or other setting.

Accordingly, there is a clearly felt need in the art for a floating decoy adapter for land use, which enables a floating decoy to be used on land and allows the floating decoy to have motion in the wind.

SUMMARY OF THE INVENTION

The present invention provides a floating decoy adapter for land use, which allows the floating decoy to have motion in the wind. The floating decoy adapter for land use (floating decoy adapter) includes an attachment plate, a vertical support plate and a base section. The attachment plate extends substantially perpendicular from one end of the vertical support and the base section extends substantially perpendicular from the other end of the vertical support in preferably an opposite direction. The attachment plate includes a retention slot. The retention slot is sized to receive a retention projection extending from a bottom of a floating decoy. The base section preferably includes a portion, which has the substantial appearance of two webbed feet. A spike is inserted through the base section and into the ground to retain the floating decoy in an upright position. The floating decoy adapter is preferably fabricated of a flexible material, such that when the wind blows, the floating decoy will pivot relative to a support surface. However, the floating decoy adapter may also be fabricated from an inflexible material.

Accordingly, it is an object of the present invention to provide a floating decoy adapter, which enables a floating decoy to be used on land.

Finally, it is another object of the present invention to provide a floating decoy adapter, which allows the floating decoy to have motion in the wind.

These and additional objects, advantages, features and benefits of the present invention will become apparent from the following specification.

DETAILED DESCRIPTION OF THE PREFERRED EMBODIMENTS

Figure 1:
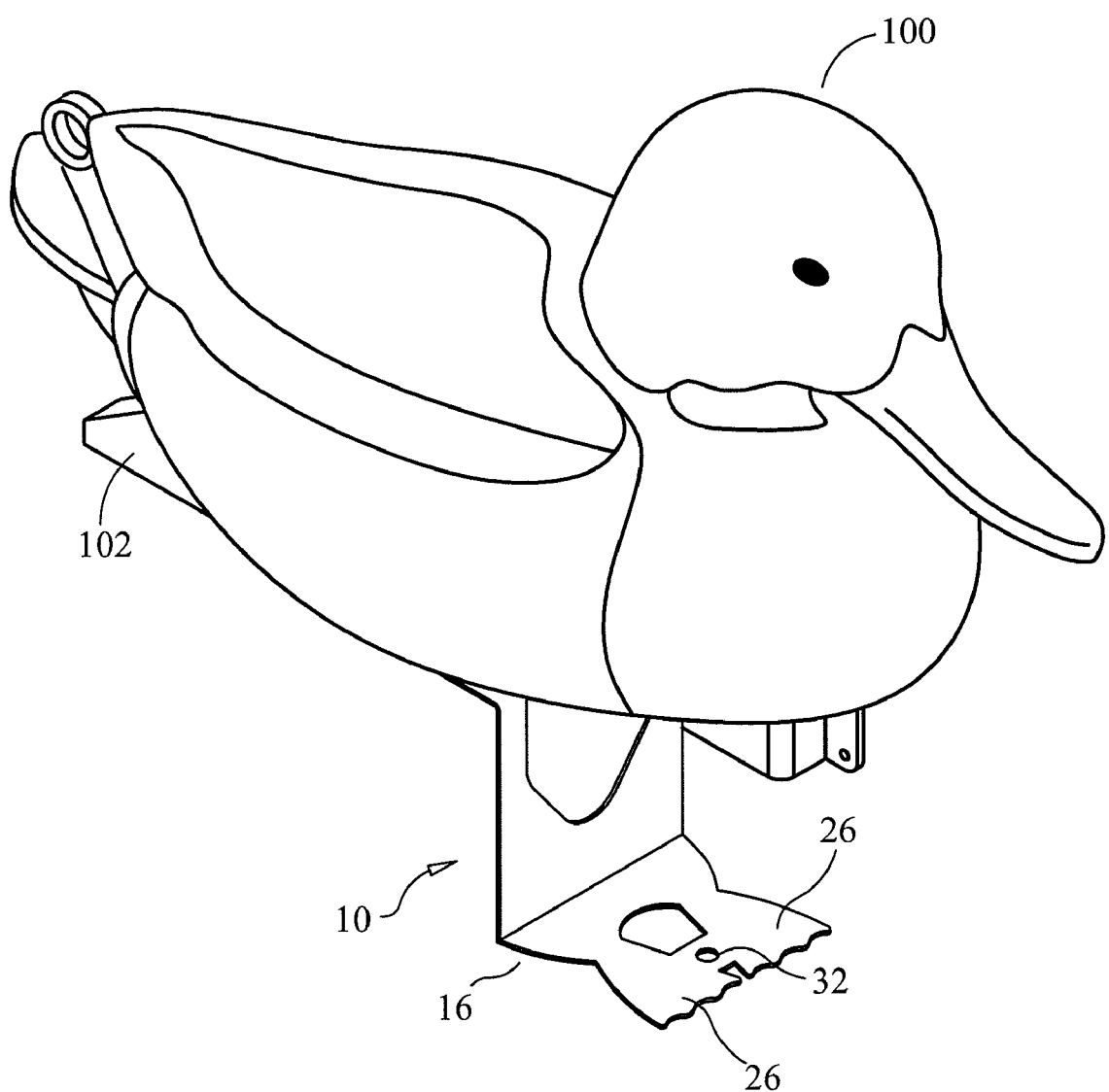
FIG. 1 is a perspective view of a floating decoy retained on a floating decoy adapter in accordance with the present invention.
Figure 2:
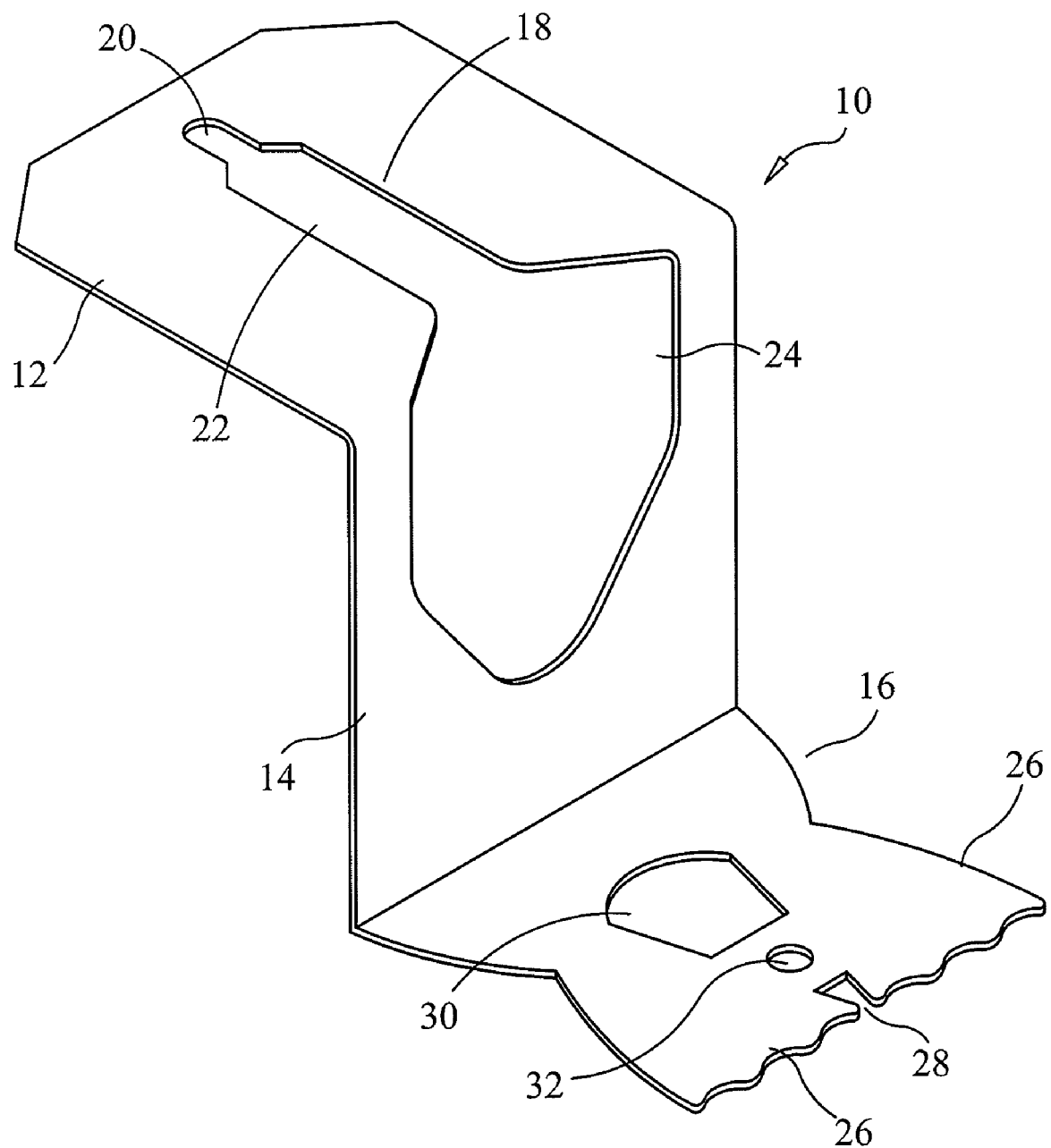
FIG. 2 is a perspective view of a floating decoy adapter in accordance with the present invention.
Figure 3:
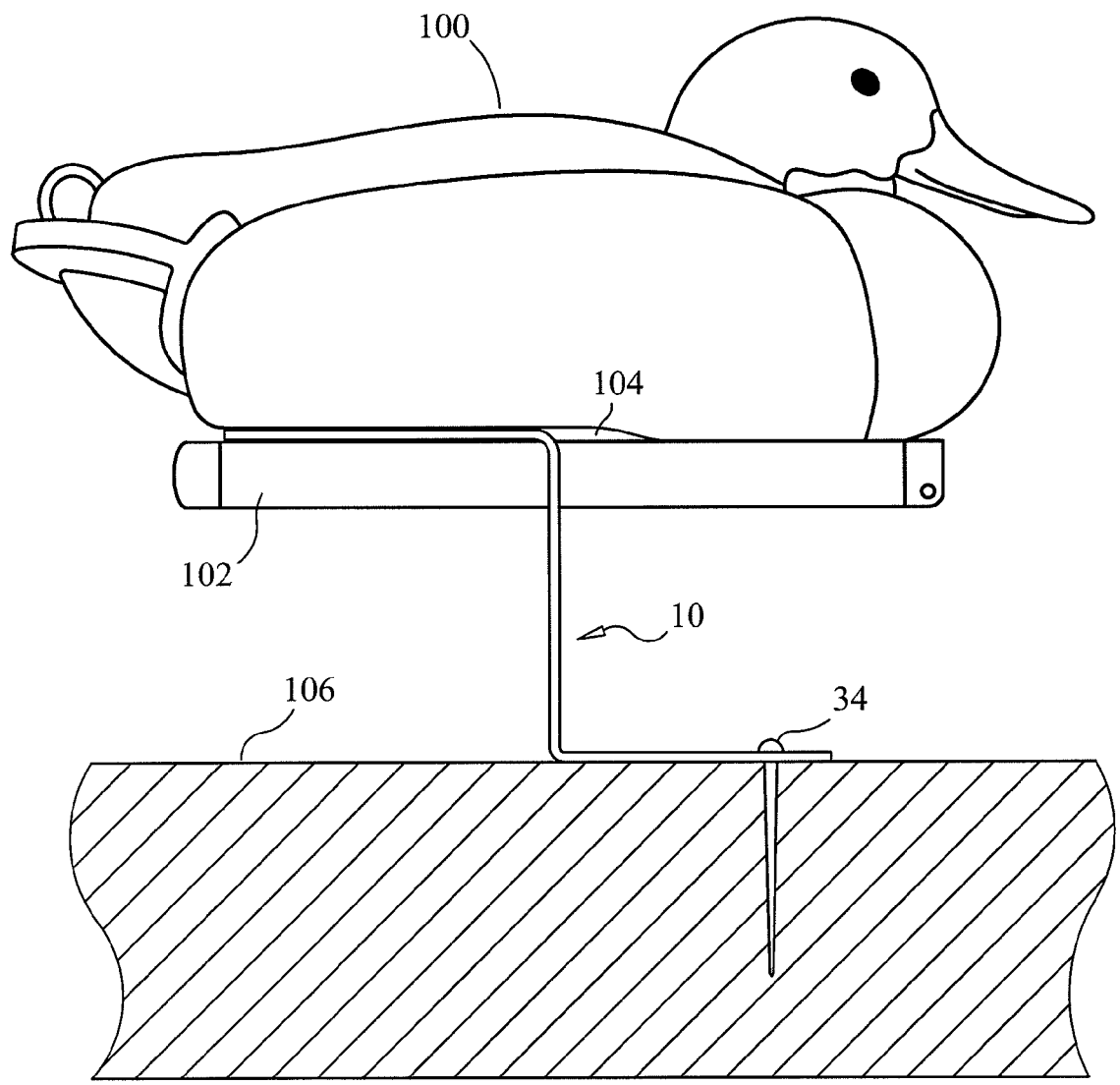
FIG. 3 is a side view of a floating decoy retained on a floating decoy adapter in accordance with the present invention.
Figure 4:
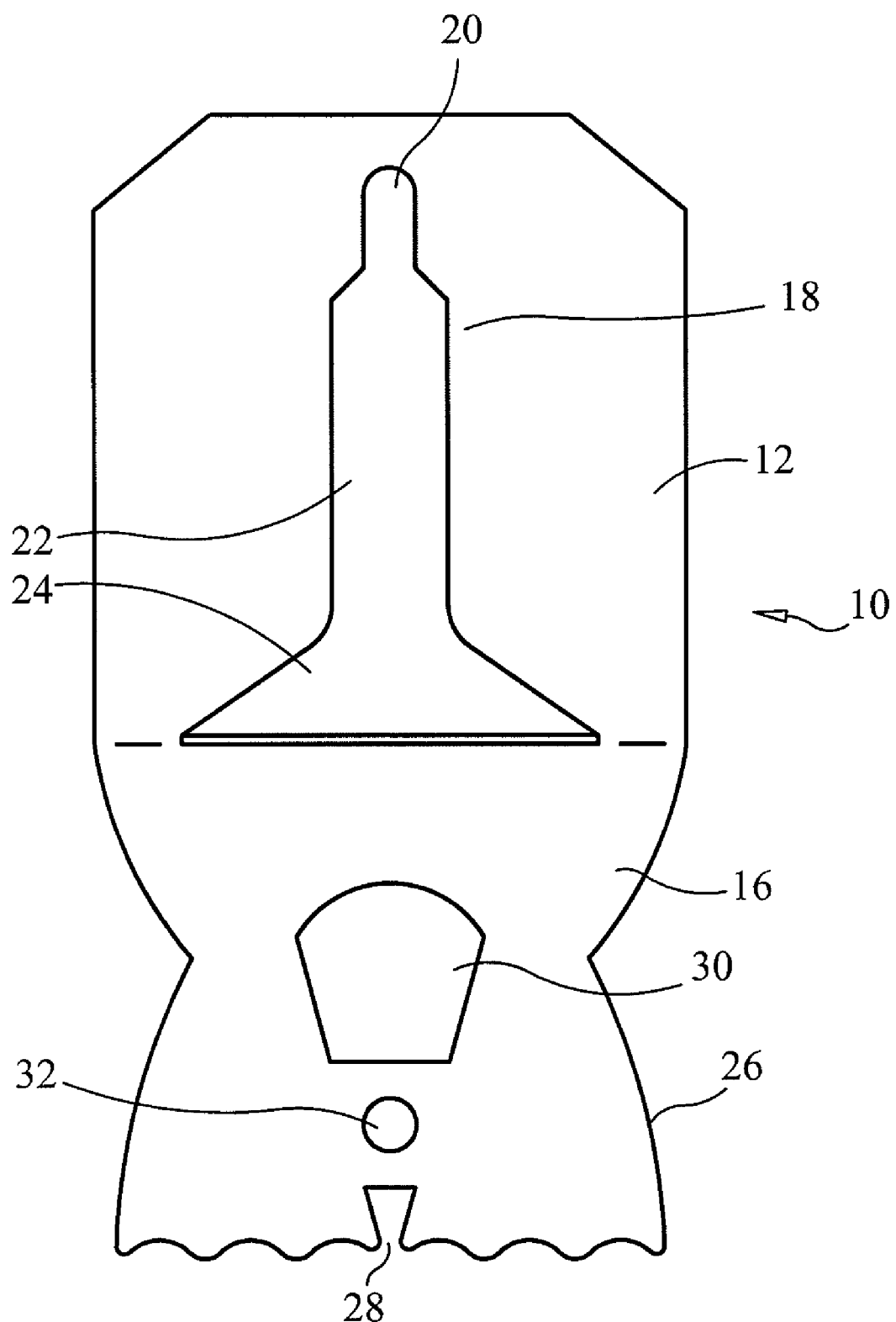
FIG. 4 is a top view of a floating decoy adapter in accordance with the present invention.

With reference now to the drawings, and particularly to FIG. 1, there is shown a perspective view of a floating decoy 100 retained on a floating decoy adapter 10. With reference to FIGS. 2-4, the floating decoy adapter 10 includes an attachment plate 12, a vertical support plate 14 and a base section 16. Although the support plate 14 has been described as vertical, it should be understood that the support plate 14 may deviate from the vertical plane while still allowing proper functioning of the present invention. The attachment plate 12 extends substantially perpendicular from one end of the vertical support 14 and the base section 16 extends substantially perpendicular from the other end of the vertical support 14 in preferably an opposite direction. The floating decoy adapter 10 is preferably fabricated from a single piece of material.

A retention slot 18 is formed substantially through a length of the attachment plate 12. The retention slot 18 preferably includes a first slot portion 20 and a second slot portion 20. The second slot portion 22 is wider than the first slot portion 20 to accommodate different floating decoys. A retention projection 102 extends from a bottom of a floating decoy 100. A web area 104 is formed between a top of the retention projection 102 and a bottom of the floating decoy 100. A width of the retention slot 20 is sized to receive a width of the web area 104. A clearance opening 24 is formed through the vertical support 12 and preferably through a portion of the attachment plate 12 to provide clearance for the retention projection 102.

At least a portion of the base section 16 preferably includes the substantially appearance of two webbed feet 26. A notch 28 is formed in a front of the base section 16 and a contoured opening 30 is formed through a center of the base section to provide the substantial appearance of the two webbed feet 26. At least one hole 32 is formed through the base section 16 preferably between the notch 28 and the contoured opening 30. The at least one hole 32 is sized to receive a spike 34. The floating decoy adapter 10 is preferably fabricated from a plastic material having a color that matches the color of the feet of the species of the floating decoy 100. However, floating decoy adapter 10 may be fabricated from other suitable materials. The spike 34 is inserted through the hole 32 into a support surface, such as the ground 106 to retain the floating decoy 100 in an upright position. The floating decoy adapter 10 is preferably fabricated of a flexible material, such that when the wind blows, the floating decoy 100 will pivot relative to the ground 106. However, the floating decoy adapter may also be fabricated from an inflexible material.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A floating decoy adapter for retaining a floating decoy, comprising:

a substantially vertical support plate including a clearance opening formed through said substantially vertical support plate to provide clearance for a retention projection of the floating decoy;

an attachment plate extending substantially perpendicular from one end of said substantially vertical support plate, said attachment plate including a retention slot formed substantially therethrough and along a length thereof, said retention slot opening into and communicating with said clearance opening at an intersection of said attachment plate and said substantially vertical support plate, and said retention slot being adapted to capture a web area of the floating decoy as at least a portion of the retention projection of the floating decoy is inserted through said clearance opening; and a base section extending substantially perpendicular from an other end of said substantially vertical support plate, and wherein said base section extends from said substantially vertical support plate in a direction opposite said attachment plate, said base section having first and second ends, said first end being at an intersection of said vertical support plate and said base section, said second end of said base section having an edge with a notch therein which extends from said second end toward said first end, and said base section having at least one opening or hole extending therethrough which is located between said notch and said first end.

2. The floating decoy adapter for retaining a floating decoy of claim 1 wherein:

said base section includes a portion having the substantial appearance of two webbed feet.

3. The floating decoy adapter for retaining a floating decoy of claim 2 wherein:

said two webbed feet have a color that matches the color of the feet of the species of the floating decoy.

4. The floating decoy adapter for retaining a floating decoy of claim 1, further comprising:

at least one spike being adapted for insertion through said base section and into a support surface.

5. The floating decoy adapter for retaining a floating decoy of claim 1 wherein:

said floating decoy adapter comprises a flexible material such that, when the wind blows, the floating decoy adapter facilitates pivoting of the floating decoy relative to a surface supporting the floating decoy adapter.

6. A floating decoy adapter for retaining a floating decoy, comprising:

a substantially vertical support plate;

an attachment plate extending substantially perpendicular from one end of said substantially vertical support plate;

a base section extending substantially perpendicular from an other end of said substantially vertical support plate, said base section extending substantially completely along its length from said substantially vertical support plate in a direction opposite to said attachment plate, said base section having first and second ends, said first end being at an intersection of said vertical support plate and said base section, said second end of said base section having an edge with a notch therein which extends from said second end toward said first end, said base section having at least one opening or hole extending therethrough which is located between said notch and said first end; and means for securing the floating decoy to said attachment plate comprising:

a retention slot formed both through and substantially along a length of said attachment plate, said retention slot being adapted to capture a web area of the floating decoy; and a clearance opening which is formed through said substantially vertical support plate adjacent said retention slot to provide clearance for a retention projection of the floating decoy, and wherein said retention slot opens into and communicates with said clearance opening at an intersection of said attachment plate and said substantially vertical support plate.

7. The floating decoy adapter for retaining a floating decoy of claim 6 wherein:

said base section includes a portion having the substantial appearance of two webbed feet.

8. The floating decoy adapter for retaining a floating decoy of claim 7 wherein:

said two webbed feet have a color that matches the color of the feet of the species of the floating decoy.

9. The floating decoy adapter for retaining a floating decoy of claim 6, further comprising:

at least one spike being adapted for insertion through said base section and into a support surface.

10. The floating decoy adapter for retaining a floating decoy of claim 6 wherein:

said floating decoy adapter comprises a flexible material such that, when the wind blows, the floating decoy adapter facilitates pivoting of the floating decoy relative to a surface supporting the floating decoy adapter.

11. A floating decoy adapter system for enabling floating decoy land use, comprising:

a floating decoy; and a floating decoy adapter, comprising:

a substantially vertical support plate which includes a clearance opening formed therethrough to provide clearance for a retention projection of the floating decoy, an attachment plate extending substantially perpendicular from one end of said substantially vertical support plate, said attachment plate being adapted to engage the floating decoy, said attachment plate includes a retention slot formed therethrough and along a substantial length thereof, said retention slot opening into and communicating with said clearance opening at an intersection of said attachment plate and said substantially vertical support plate, and said retention slot is adapted to capture a web area of the floating decoy as at least a portion of the retention projection of the floating decoy is inserted through said clearance opening, and a base section extending substantially perpendicular from an other end of said substantially vertical support plate, and wherein said base section extends from said substantially vertical support plate in a direction opposite said attachment plate.

12. The floating decoy adapter system of claim 11 wherein:

said base section includes a portion having the substantial appearance of two webbed feet.

13. The floating decoy adapter system of claim 12 wherein:
said two webbed feet have a color that matches the color of the feet of the species of the floating decoy.

14. The floating decoy adapter system of claim 11, further comprising:
at least one spike being adapted for insertion through said base section and into a support surface.

15. The floating decoy adapter system of claim 11 wherein:
said floating decoy adapter comprises a flexible material such that, when the wind blows, the floating decoy adapter facilitates pivoting of the floating decoy relative to a surface supporting the floating decoy adapter.

* * * * *